Sept. 28, 1943. S. R. HOWARD 2,330,361
METHOD OF AND APPARATUS FOR PRODUCING BAGS
Filed March 14, 1941 4 Sheets-Sheet 1
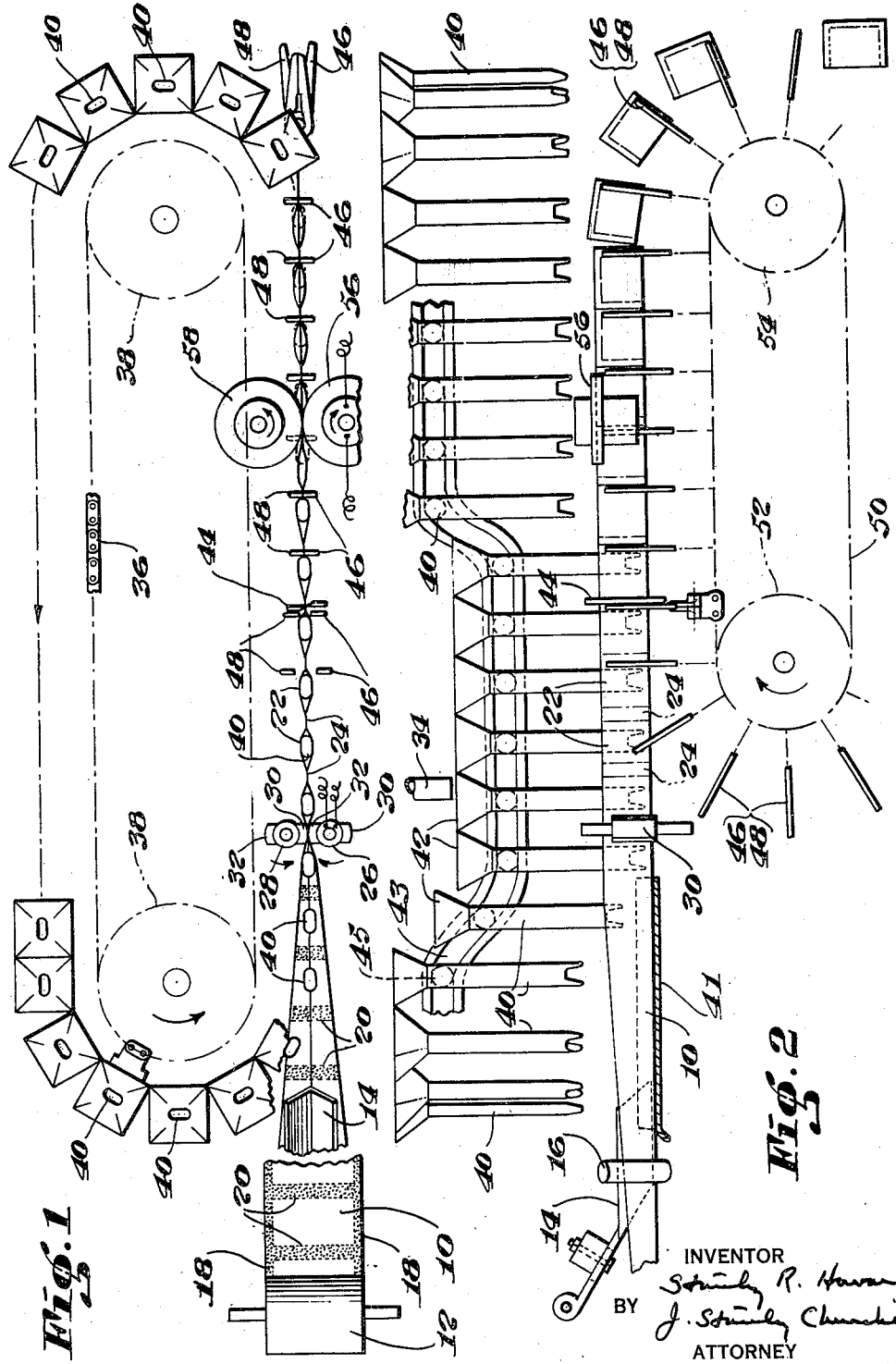
INVENTOR
Stanley R. Howard
BY J. Stanley Churchill
ATTORNEY Sept. 28, 1943. S. R. HOWARD 2,330,361
METHOD OF AND APPARATUS FOR PRODUCING BAGS
Filed March 14, 1941 4 Sheets-Sheet 2
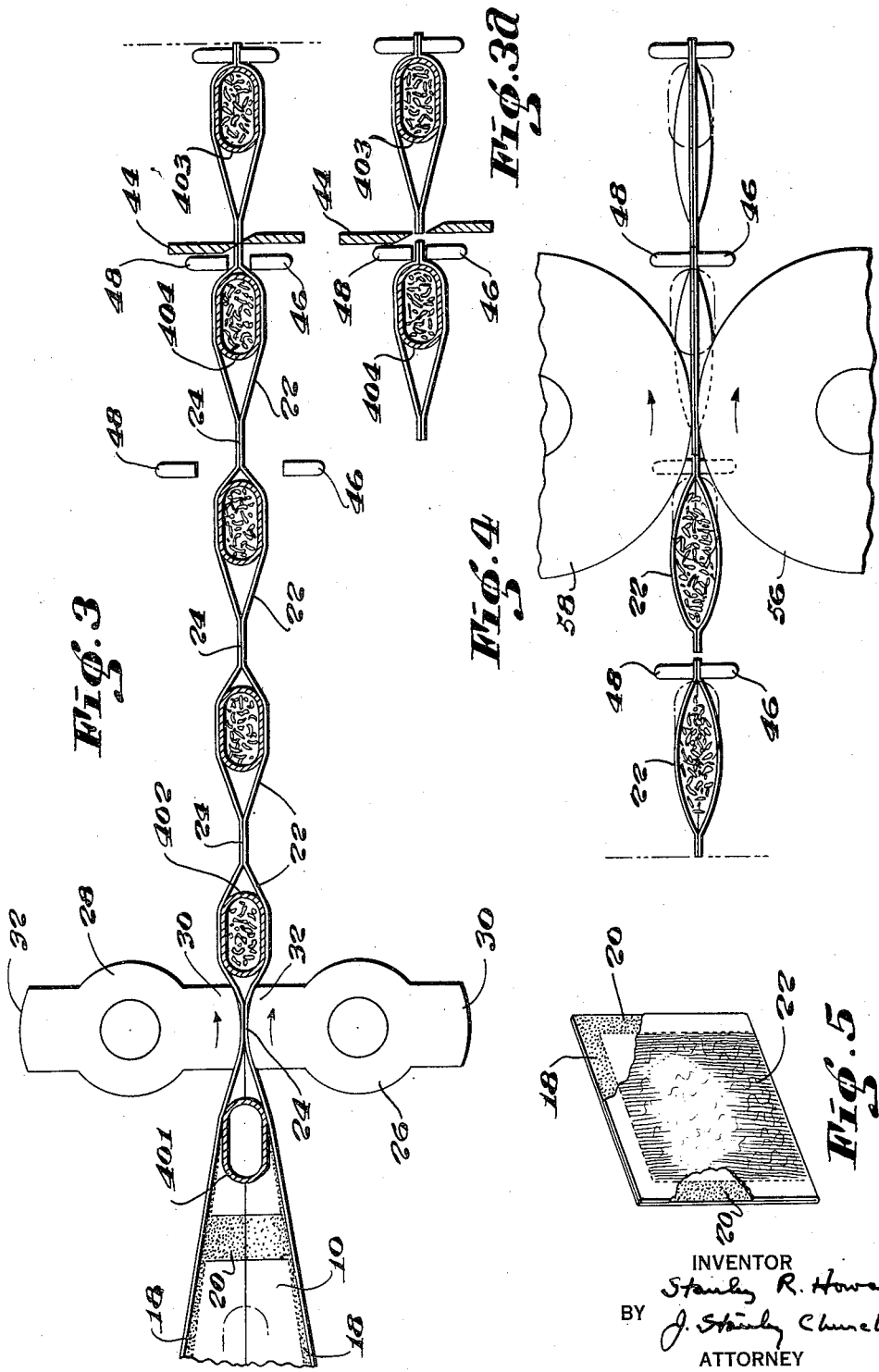
INVENTOR
Stanley R. Howard
BY J. Stanley Churchill
ATTORNEY Sept. 28, 1943.    S. R. HOWARD    2,330,361
METHOD OF AND APPARATUS FOR PRODUCING BAGS
Filed March 14, 1941    4 Sheets-Sheet 3
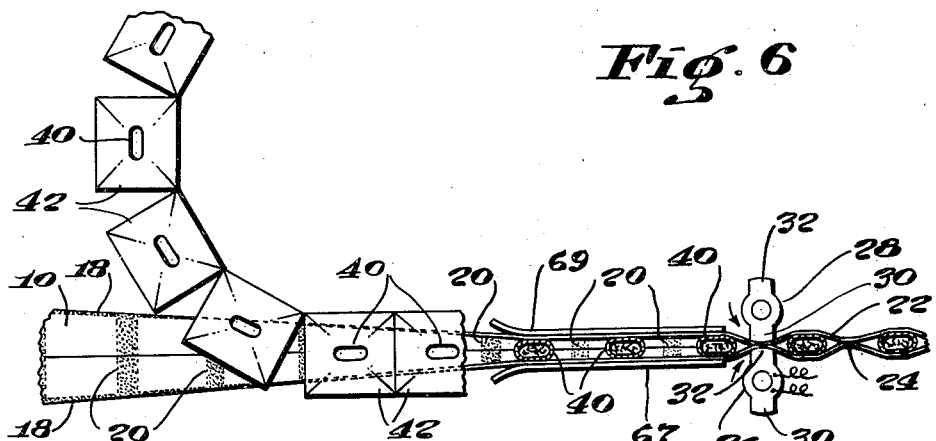
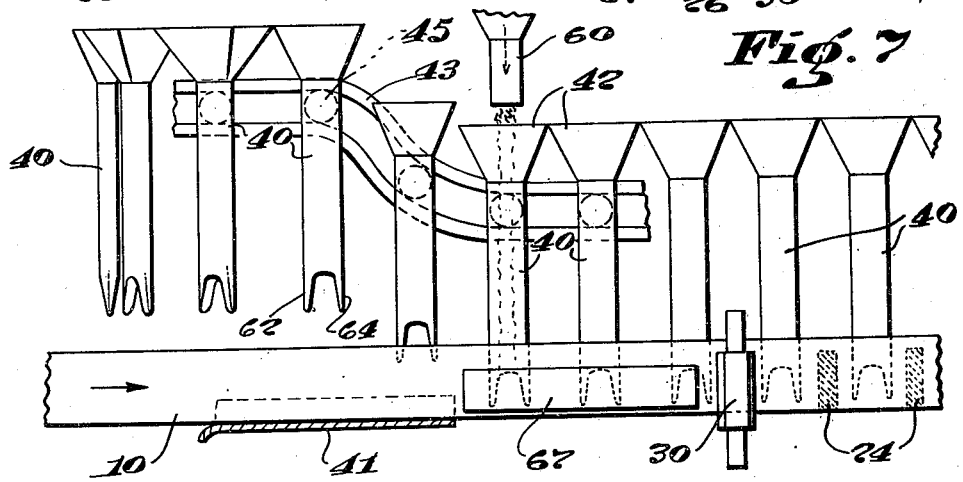
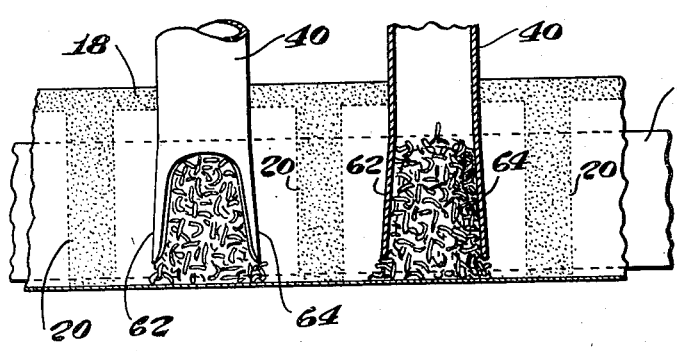
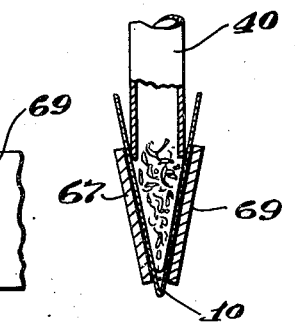
INVENTOR
Stanley R. Howard
BY J. Stanley Churchill
ATTORNEY

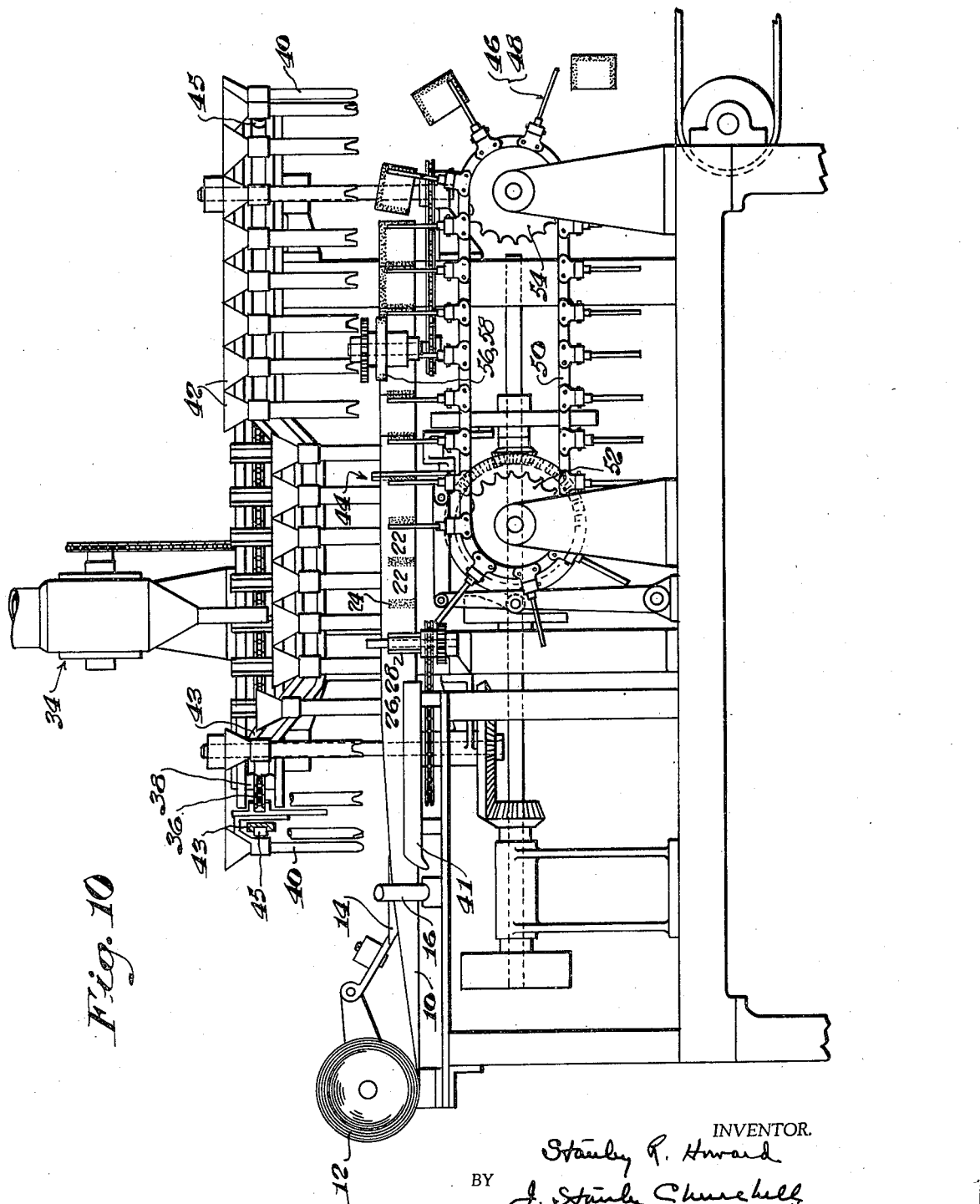

Patented Sept. 28, 1943

2,330,361

UNITED STATES PATENT OFFICE 2,330,361

METHOD OF AND APPARATUS FOR PRODUCING BAGS

Stanley R. Howard, Milton, Mass., assignor to Pneumatic Scale Corporation, L'mited, Quincy, Mass., a corporation of Massachusetts Application March 14, 1941, Serial No. 383,280

25 Claims. (Cl. 93—3)

This invention relates to a method of and to apparatus for producing bags.

One object of the invention is to provide a novel method of and novel apparatus for the production of bags in an efficient, economical, rapid and practical manner.

A further object of the invention is to provide a novel and improved method of and apparatus for making and filling bags such as individual tea bags in an efficient, economical, rapid and practical manner.

With these general objects in view and such others as may hereinafter appear, the invention consists in the method and apparatus for the production of individual bags and more particularly for the production of filled individual bags such as tea bags, hereinafter described and particularly defined in the claims at the end of this specification.

In the drawings a sufficient portion of apparatus embodying and for practicing the present invention in the production of bags, and particularly tea bags, has been illustrated to enable the invention to be understood, wherein Fig. 1 is a diagrammatic plan view of such apparatus; Fig. 2 is a side elevation of the apparatus shown in Fig. 1; Figs. 3 and 3A are sectional plan views illustrating certain steps in the present method of making the bag; Fig. 4 is an enlarged detail illustrating the apparatus for sealing the top seam of the formed and filled bags; Fig. 5 is a perspective view with portions broken away illustrating one of the bags produced in accordance with the present invention; Fig. 6 is a diagrammatic plan view partly in cross-section, illustrating a portion of a modified form of the present apparatus; Fig. 7 is a side elevation of the apparatus shown in Fig. 6; Fig. 8 is an enlarged cross sectional detail in side elevation illustrating the manner in which the bag sections are filled; Fig. 9 is an end view in cross-section of the filling apparatus shown in Fig. 8; and Fig. 10 is a side elevation of the complete machine embodying the invention.

In general, the present invention contemplates a method of and also apparatus for the production of bags from a web of bag forming material wherein the web is operated upon to produce a strip of connected bag sections, each having a closed bottom and open top. Provision is made for folding the web longitudinally and for sealing the strip thus formed transversely at predetermined spaced intervals to form the side seams of the bags. Provision is also made for filling the bag sections with a quantity of tea or other material and for severing the filled bag sections from the strip and for sealing the tops of the bags.

The bag forming material may and preferably will comprise a paper web provided with bands of thermo-plastic adhesive along the longitudinal edges thereof and also upon spaced transverse portions of the web corresponding to the side seams of the bag sections to be formed. In accordance with one feature of the present invention, when the web thus prepared is folded and sealed to form bag sections, provision is made for moving the strip into registered relation to a cutter so as to insure that the connecting side seams between adjacent bag sections may be severed at a predetermined point. In the preferred embodiment of the invention, the registration is preferably effected by a member which is introduced into the interior of the bag section and arranged to engage the rear edge of the forward side seam of a bag section to effect movement of the strip into a predetermined position with relation to the cutter so as to register the side seam of a bag section in the desired operative position to be cut. The registering members preferably comprise a plurality of hollow filling tubes arranged to deposit the commodity into the bag sections as the strip is being moved and provision is made for gripping the bag sections as they are severed from the strip and for moving the several bag sections, during which time the filling or registering tubes are withdrawn and the bag sections are thereafter sealed along the top edges to complete the production of the bag.

One feature of the present invention resides in the provision of strip feeding and registering mechanism designed to compensate for any irregularity in the spacing or distance between individual bag sections whereby each bag section ready to be severed from the end of the strip is advanced into a predetermined position.

Referring now to the drawings, in the apparatus more or less diagrammatically illustrated therein, a web 10 of bag forming material is withdrawn from a supply roll 12 and passed beneath and around a folding plate 14 which, in cooperation with shaping rollers 16, operates to fold the web lengthwise into substantially U-shape. In the preferred embodiment of the invention, the bag forming material may comprise a paper web provided with longitudinal bands or strips 18 of thermo-plastic adhesive along the edges of the web and transverse bands 20 spaced in accordance with the bag sections to be formed. The thermo-plastic, as a coating or impregnant, is preferably of a character capable when heated and pressed of sealing together the opposed sides of the web.

Provision is made for operating upon the web 10 of bag forming material to form a strip comprising a series of individual bag sections 22 each having a closed bottom and open top and connected by sealed side seams 24, and in the illustrated apparatus which is designed for the production of paper tea bags, the web 10 after being folded longitudinally, is passed between driven presser rolls 26, 28 one of which is heated. As herein shown, the presser rolls 26, 28 are provided with opposed contacting portions 30, 32 arranged to cooperatively engage and press the strip at spaced intervals corresponding to the transverse bands of adhesive 20. The circumferential spacing of the contacting portions 30, 32 of each presser roll is substantially equal to the pitch distance between the spaced transverse bands of heat sealing adhesive 20 and in operation, the rollers are rotated in timed relation to the rate of movement of the strip through any suitable driving mechanism, not shown. In practice, the width of the heat sealing or contacting portions 30, 32 of the presser rolls is preferably substantially greater than the width of the spaced bands of adhesive, whereby to insure complete sealing of the side seam, particularly the rear edge thereof for the purpose to be hereinafter described. The heat sealing material may and preferably will be of a quick drying character so that a firm band is provided at the side seams 24 immediately upon the application of heat and pressure.

Referring now to Figs. 1 and 2, as therein shown, provision is made for successively lowering a plurality of filling tubes or funnels 40 between the folds of the bag forming material prior to the sealing of the side seams 24 so that as the strip is advanced, the bag sections are formed about the lower ends of the tubes. In the illustrated embodiment of the invention, the tubes 40 are carried by an endless chain 36 arranged to run over sprockets 38, one of which may be driven through any usual or preferred driving mechanism, not shown, to cause the tubes to be continuously moved. The filling tubes 40 are arranged to be lowered and raised into and out of operative relation with the strip by mechanism including a stationary cam 43. and as herein shown, each tube is provided with a roller 45 arranged to cooperate with the cam as the tubes are advanced by the chain 36 to present the lower end portion of a tube into each of the bag sections and to subsequently effect withdrawal of the tubes therefrom. It will be seen that the shape of the sealing rollers 26, 28 permit passage of the tubes therebetween as the strip is advanced.

In the embodiment of the invention illustrated in Figs. 1 to 4, after the filling tubes or funnels 40 are lowered between the folds of the bag making material and the side seams 24 have been sealed, the tubes are arranged to pass a continuously operating material feeding device, as indicated generally at 34, adapted to feed a substantially uniform stream of the commodity to be packaged. The filling tubes are provided with flared edges 42 at their upper ends, adjacent edges of successive tubes being arranged in contiguous engagement, so that, in operation, the continuously advancing funnels 40 are each provided with a predetermined quantity of the commodity being packaged.

Provision is made for utilizing the movement of the filling tubes 40 to effect withdrawal of the web from the roll and to advance the web past the presser rolls 26, 28 and into registered position with relation to a cutter 44 to effect severance of successive endmost bag sections through the side seams 24. The endless carrier 36 is arranged to be moved to cause the strip of bag sections to be advanced by the engagement of at least one of the tubes 40 with the forward side seam 24 of at least one of the bag sections 22. The movement of the tubes is definitely related to the position of the cutter so as to insure proper registration of the side seams as the bag sections are successively advanced.

Referring now particularly to Fig. 3 it will be observed that the tube 401 in its fully lowered position immediately subsequent to the sealing rolls 26, 28, is disposed substantially midway between the transverse band 20 of the web and the side seam 24 being sealed so that when a succeeding side seam is sealed, the tube is disposed in a central position in its bag section, as indicated at 402. It will be observed that the tube 403 immediately beyond the cutter 44 is in engagement with the edge of the forward side seam of its bag section and operating to move the web. Thus, in effect, the tubes are progressively advanced in their respective bag sections until the tube in the endmost bag section of the strip, prior to severance of the bag from the strip, is in operative engagement with the forward side seam to effect advancement of the strip.

The above described condition is effected by making the pitch distance between successive tubes slightly greater than the pitch distance between successive bag sections. Thus, in operation, when the endmost bag section is severed from the strip while the tubes 403 is in engagement with the forward edge of the interior of its bag section, the subsequent portion of the strip will come to rest immediately upon the operation of the cutter, whereupon the next succeeding tube 404 will be advanced into operative engagement with its bag section, as shown in Fig. 3A, to take up the feeding of the strip. Each time a bag section is cut from the strip, the latter will lag momentarily an amount equal to the difference between the pitch distance of the tubes and the pitch distance of the bag sections so that subsequent tubes disposed intermediate the sealing rolls and the cutter are gradually advanced in their respective bag sections until they are in a position to take up the feeding of the strip, as described. Any suitable means, such as the V-shaped guide rail 41, may be employed for guiding and supporting the bottom and sides of the strip as it is advanced.

From the description thus far, it will be observed that the above described feature of the invention enables the strip to be advanced to present the endmost bag section, ready to be cut, into exact register with the cutter 44 irrespective of any slight departure from the normal spacing between successive bag sections. Such departures from the normal or predetermined spaced distance between bag sections might be due to irregularities in the application of the adhesive bands 20, to stretching of the web, or other causes beyond the control of the bag manufacturer. Any irregularities or departures from the normal predetermined spacing between bag sections are compensated for during the momentary lag of the strip between the time the endmost bag section is severed until the succeeding endmost bag section is operatively engaged by its individual filling tube. In other words, each individual endmost bag section is positively advanced to present its side seam 24 into register with the cutter 44 independently of the prior or subsequent bag sections.

The cutter 44, as above described, is arranged to be operated in definite timed relation to the movement of the filling tubes 40 to effect severance of the bag sections through the sealed side seams 24. The cutter 44 may and preferably will comprise a pair of shears arranged to be moved along with the strip and to cut the endmost bag section during the forward movement thereof. The shears may be slidably mounted longitudinally of the web, and in operation, after an endmost web has been severed during the forward movement of the shears with the strip, the shears may be retracted until they coincide with the next succeeding side seam whereupon the shears may be again moved forwardly at the same rate as the strip during which time another severing operation may be performed. Any usual or preferred mechanism, not shown, may be provided for actuating the shears and for reciprocating the shearing unit in timed relation to the movement of the filling tubes or funnels 40.

From the description thus far it will be observed that in the illustrated apparatus the continuously moving filling tubes 40 which successively engage the forward side seam of their respective bag sections comprise the sole moving means for advancing the strip during the bag forming and filling operations, and that the tube in the endmost bag section of the strip operates to register the bag in definite relation to the cutter 44 to effect severance of the endmost bag section from the strip through a predetermined point in the side seam 24. It will be apparent that the forward advance of the strip by the filling tube in engagement with the endmost bag section operates to withdraw the web 10 from the roll 12 past the forming plate 14 and the presser rolls 26, 28, the latter being rotated in timed relation to the movement of the filling tubes. The movement of the filling tubes is such as to present successive transverse bands 20 of adhesive of the strip into substantially registered position to the presser rolls. As above described, the forward advance of the strip will vary slightly in accordance with any irregularities in the spacing, but since the sealing portions 30, 32 are considerably wider than the width of the bands 20 to be sealed, the latter are sure to come within some portion of the sealing surfaces 30, 32 so that any slight variance in the forward advance of the strip will not prevent registration with the sealing rollers as above described.

In the illustrated embodiment of the invention, provision is made for gripping successive severed bag sections as they are severed from the strip and for conveying the bag sections past heat sealing mechanism for sealing the tops of the bags after the filling tubes 40 have been withdrawn therefrom. Simultaneously upon severence of the endmost bag section from the strip, as above described, the forward edge of the severed bag section is grasped between gripper jaws 46, 48 carried by an endless chain 50 which runs over sprockets 52, 54, as shown in Fig. 2. The gripper jaws are arranged to be moved along in timed relation to the filling tubes 40, and in operation, a pair of gripper jaws is arranged to close upon the bag section just as it is being severed from the strip as shown in Fig. 3. As the bag sections are being carried along and supported by the gripper jaws, the filling tubes are withdrawn by any suitable mechanism, not shown, whereupon the bags are passed between heat sealing rollers 56, 58 which may be driven in timed relation to the movement of the grippers, to seal the top of the bag sections. Thereafter, the gripping jaws are opened to release the completely filled and sealed bag. It will be observed that upon withdrawal of the tubes from their respective bag sections, the tea or other commodity within the tube is retained in the bag.

Referring now to Figs. 6 to 9 inclusive, a modified form of the present invention, as therein shown, may include provision for depositing the commodity to be packaged into the filling tubes 40 and between the folds of the bag forming strip, prior to sealing the side seams 24. As shown in Figs. 6 and 7, the filling tubes 40 are lowered between the folds of the bag making material to present the lower ends of successive tubes in a position intermediate successive transverse bands of heat sealing adhesive 20 and in a substantially central position of the bag section to be formed.

As illustrated in Fig. 7, as soon as the filling tubes are lowered into position between the folds of the strip, they are provided with a charge of the commodity being packaged by a continuously operating feeding device 60 disposed in advance of the heat sealing rollers 26, 28 so that the material is deposited into the bag sections to be formed prior to heat sealing the side seams.

It will be observed that the lower ends of the filling tubes 40 are shaped so as to permit free passage of the material through the sides of the tube adjacent the web while the front and rear portions 62, 64 of the tube extend downwardly to confine the material in substantially the center of the bag section. Provision is made for preventing the material from running out through the open sides of the tube during its advance with the web into sealing position so as to prevent the material from coming between the sealed areas. As herein shown, a pair of side plates 67, 69 is provided in order to retain the sides of the web in contiguous engagement with the adjacent sides of the tube whereby the charge of material is confined to the center of the bag until after the side seams 24 have been sealed. Thereafter, the bag is completed in the manner above described by severing the individual bag sections from the strip, withdrawing the filling tube, and sealing the top of the bag.

While the preferred embodiment of the invention has been herein illustrated and described, it will be understood that the invention may be embodied in other forms within the scope of the following claims.

Having thus described the invention, what is claimed is:

1. In a method of making individual filled bags, the steps comprising forming bag forming material into the form of a strip having a closed bottom and open top, sealing the bag forming material of such strip transversely at predetermined spaced intervals to form the side seams of a series of bag sections, depositing a commodity into successive bag sections, and moving the strip by a member disposed within a bag section into registered position with relation to a cutter for severing successive bag sections from the strip through the aforesaid sealed side seams.

2. In a method of making individual filled bags, the steps comprising forming bag forming material into the form of a strip having a closed bottom and open top, sealing the bag forming material of such strip transversely at predetermined spaced intervals to form the side seams of a series of bag sections, depositing a commodity into successive bag sections, and moving the strip into registered position with relation to a cutter by a member disposed within a bag section and engaging the rear edge of the forward side seam thereof whereby to enable the cutter to sever the bag section from the strip through the aforesaid sealed side seam thereof.

3. In a method of making individual filled bags, the steps comprising forming bag forming material into the form of a strip having a closed bottom and open top, sealing the bag forming material of such strip transversely at spaced intervals to form the side seams of a series of bag sections, moving the strip into registered position with relation to a cutter by a hollow member disposed within a bag section, and engaging the rear edge of the forward side seam thereof and introducing a commodity into the bag section through said hollow member.

4. In a method of making individual filled bags, the steps comprising forming bag forming material into the form of a strip having a closed bottom and open top, sealing the bag forming material of such strip transversely at predetermined spaced intervals to form the side seams of a series of bag sections, depositing a commodity into successive bag sections, and moving the strip by a member disposed within a bag section into registered position with relation to a cutter for severing successive bag sections from the strip through the aforesaid sealed side seams, and sealing the top of successive bag sections.

5. In a method of making individual filled bags, the steps comprising forming bag forming material into the form of a strip having a closed bottom and open top, sealing the bag forming material of such strip transversely at predetermined spaced intervals to form the side seams of a series of bag sections, depositing a commodity into successive bag sections, and moving the strip by a member disposed within a bag section into registered position with relation to a cutter for severing successive bag sections from the strip through the aforesaid sealed side seams, and sealing the top of successive bag sections after severance from said strip.

6. In a machine for making individual filled bags, in combination, means for forming bag forming material into the form of a strip having a closed bottom and open top, means for sealing the bag forming material of such strip transversely at predetermined spaced intervals to form the side seams of a series of bag sections, filling means for filling said bag sections, a cutter, means for moving the strip into registered position with relation to the cutter whereby to enable the cutter to sever successive bag sections from the strip through the aforesaid sealed side seams and movable gripping means operated in timed relation to said strip moving means and said cutter for gripping and supporting the bag section immediately upon being severed and for thereafter moving the same.

7. In a machine for making individual filled bags, in combination, means for forming bag forming material into the form of a strip having a closed bottom and open top, means for sealing the bag forming material of such strip transversely at predetermined spaced intervals to form the side seams of a series of bag sections, filling means for filling said bag sections, a cutter, means for moving the strip into registered position with relation to the cutter whereby to enable the cutter to sever successive bag sections from the strip through the aforesaid sealed side seams, movable gripping means operated in timed relation to said strip moving means and said cutter for gripping and supporting the bag section immediately upon being severed and for thereafter moving the same, and top sealing means to which said bag section is presented by said gripping means.

8. In a machine for making individual filled bags, in combination, means for forming bag forming material into the form of a strip having a closed bottom and open top, means for sealing the bag forming material of such strip transversely at predetermined spaced intervals to form the side seams of a series of bag sections, filling means for filling successive bag sections, a cutter, means engageable with the rear edge of the forward side seam of a bag section for moving it into registered position with relation to said cutter whereby to enable the cutter to sever the bag section through the sealed side seam, and movable gripping means operated in timed relation to said strip moving means and said cutter for gripping and supporting the bag section immediately upon being severed, and for thereafter moving the same.

9. In a machine for making individual filled bags, in combination, means for forming bag forming material into the form of a strip having a closed bottom and open top, means for sealing the bag forming material of such strip transversely at predetermined spaced intervals to form the side seams of a series of bag sections, filling means for filling said bag sections, a cutter, and means engageable with the rear edge of the forward side seam of a bag section for moving it into registered position with relation to said cutter whereby to enable the cutter to sever the bag section through the sealed side seam, means for sealing the top of the filled bag sections and gripping means for gripping the individual bag sections severed by said cutter and presenting them to said top sealing means.

10. In a method of making individual filled bags, the steps comprising folding a strip of bag forming material longitudinally, connecting the folded halves of the longitudinally folded strip transversely at spaced intervals to form the side seams of bag sections open at their tops, filling the bag sections thus formed and moving the strip into a registered position with relation to a cutter by a member disposed within the bag section and engaging the interior of the bag section at the forward side seam thereof.

11. In a method of making individual filled bags, the steps comprising folding a strip of bag forming material longitudinally, sealing the folded halves of the longitudinally folded strip transversely at spaced intervals to form the side seams of bag sections open at their tops, filling the bag sections thus formed through a hollow member disposed within the bag section and moving the strip into a registered position with relation to a cutter by the engagement of said hollow member with the interior of the bag section at the forward side seam thereof.

12. In a bag making and filling machine, in combination, means for operating upon bag forming material provided with sealable material disposed thereon in spaced transverse bands to form a strip thereof having a closed bottom and open top, means for sealing the bag forming material of such strip transversely at said spaced bands to form the side seams of a series of bag sections, means for depositing a commodity into successive bag sections, a cutter, and means including a plurality of movable members extending within said bag sections and engageable with the rear edge of the forward side seam for moving the strip into registered position with relation to said cutter, said sealing means being of a substantially greater width than the spaced bands to be sealed whereby to insure accurate disposition of the rear edge of the side seams.

13. In apparatus for making and filling bags, in combination, means for forming bag forming material into a strip having a closed bottom and open top, means for sealing the bag forming material of such strip transversely at predetermined spaced intervals to form the side seams of a series of bag sections, a cutter for severing bag sections from the strip, filling means including a plurality of continuously moving funnels mounted to dispose the lower end portion of one of said funnels in each of a plurality of said bag sections during the filling operation and to withdraw said funnels therefrom after the filling operation, and means for sealing the top of successive of said filled bag sections.

14. In apparatus for making and filling bags, in combination, means for forming bag forming material into a strip having a closed bottom and open top, means for sealing the bag forming material of such strip transversely at predetermined spaced intervals to form the side seams of a series of bag sections, a cutter for severing bag sections from the strip, filling means including a plurality of continuously moving funnels mounted to dispose the lower end portion of one of said funnels in each of a plurality of said bag sections during the filling operation and to withdraw said funnels therefrom after the filling operation, and means for sealing the top of successive of said filled bag sections, said bag sections being moved into registered position with relation to said cutter by the engagement of a funnel with the rear edge of the forward side seam of the bag section in which said funnel is disposed.

15. In bag making and filling apparatus, in combination, bag filling means including a plurality of hollow members through which a commodity may be introduced into successive bags, and bag forming means cooperating therewith and including means for forming a web of bag forming material about the lower portion of successive of said hollow members and for securing together the side portions thereof between successive hollow members to form a series of connected bags about successive of said hollow members.

16. In bag making and filling apparatus, in combination, bag filling means including a plurality of hollow members through which a commodity may be introduced into successive bags, bag forming means cooperating therewith and including means for forming a web of bag forming material about the lower portion of successive of said hollow members and for securing together the side portions thereof between successive hollow members to form a series of connected bags about successive of said hollow members, means for filling the bags through said hollow members, and means for thereafter withdrawing said hollow members therefrom.

17. In a machine for making individual filled bags, in combination, means for forming bag forming material into the form of a strip having a closed bottom and open top, means for sealing the bag forming material of such strip transversely at predetermined spaced intervals to form the side seams of a series of bag sections, and means for moving said strip past said forming means and said sealing means comprising a plurality of movable members extending within said sealed bag sections.

18. In a machine for making individual filled bags, in combination, means for forming bag forming material into the form of a strip having a closed bottom and open top, means for sealing the bag forming material of such strip transversely at predetermined spaced intervals to form the side seams of a series of bag sections, a cutter for severing successive endmost bag sections from the strip, and means for moving said strip past said forming means and sealing means and to present successive endmost bag sections into registered relation to said cutter, said strip moving means comprising a plurality of movable members extending within said sealed bag sections.

19. In a method of making individual filled bags, the steps comprising forming bag forming material into the form of a strip having a closed bottom and open top, sealing the bag forming material of such strip transversely at predetermined spaced intervals to form the side seams of a series of bag sections, depositing a commodity into successive bag sections and moving the strip into registered position with relation to a cutter by a plurality of members disposed within successive bag sections, the member within the endmost bag section engaging the rear edge of the forward side seam thereof severing the endmost bag section from the strip through the aforesaid sealed side seam thereof, adjacent the member inserted thereon, then advancing a succeeding member into engagement with the rear edge of the forward side seam of the succeeding bag section and again moving the strip into operative relation to the cutter whereby to compensate for any variation in distance between said side seams.

20. In apparatus for making and filling bags, in combination, an endless carrier provided with a series of hollow funnel members mounted thereon at spaced intervals, means for forming bag forming material into the form of a strip having a closed bottom and open top, means for sealing the bag forming material of the strip transversely at predetermined spaced intervals to form the side seams of a series of bag sections, means for successively lowering the funnels to cause the lower ends of a plurality thereof to be disposed in the bag sections, and a cutter for severing the bag sections from the strip, said funnels being spaced apart a distance slightly greater than the distance between the side seams of adjacent bag sections, whereby as the funnels advance, they are progressively moved into engagement with the rear edge of the forward side seam of a bag section to move the same into registered position with relation to the cutter.

21. In apparatus for making and filling bags, in combination, means for forming bag forming material into a strip having a closed bottom and open top, means for sealing the bag forming material of such strip transversely at predetermined spaced intervals to form the side seams of a series of bag sections, a cutter for severing bag sections from the strip, filling means including a plurality of movable funnels mounted to dispose the lower end portion of one of said funnels in each of a plurality of said bag sections during the filling operation and to withdraw said funnels therefrom after the filling operation, and means for sealing the top of successive of said filled bag sections.

22. In apparatus for making and filling bags, in combination, means for feeding a strip of bag forming material having a closed bottom and open top, means for moving successive hollow funnel members in a direction substantially at right angles to the movement of the strip to dispose the end portion of the funnel members within such strip, means for sealing the bag forming material of the strip transversely at predetermined spaced intervals and around said hollow funnel members to form the side seams of a series of bag sections, and means for filling such bag sections through said hollow members.

23. In apparatus for making and filling bags, in combination, means for feeding a strip of bag forming material having a closed bottom and open top, means for sealing the bag forming material of said strip transversely at predetermined spaced intervals to form the side seams of a series of bag sections, means for moving successive hollow funnel members into and from a position with the ends thereof disposed within said strip, means for filling the bag sections through said hollow members, and means for subsequently severing the bag sections from the strip.

24. In apparatus for making and filling bags, in combination, an endless carrier provided with a series of hollow funnel members mounted thereon at spaced intervals, means for forming bag forming material into the form of a strip having a closed bottom and open top, means for sealing the bag forming material of the strip transversely at predetermined spaced intervals to form the side seams of a series of bag sections, means for successively lowering the funnels to cause the lower ends of a plurality thereof to be disposed in the bag sections, and a cutter for severing successive bag sections from the strip, said funnels being spaced apart a distance slightly greater than the distance between the side seams of adjacent bag sections and being arranged to successively operatively engage successive endmost bag sections to register the latter with said cutter, whereby said strip is permitted to lag momentarily between the time one endmost bag section is cut and the time a succeeding funnel operatively engages its bag section to move the strip whereby to compensate for variations in the distance between said side seams and to assure accurate registration of successive bag sections with the cutter.

25. In apparatus for making and filling bags, in combination, means for feeding a strip of bag forming material having a closed bottom and open top including a plurality of movable members, means for moving successive of said movable members to dispose the end portions thereof within the strip, means for sealing the bag forming material of the strip transversely at predetermined spaced intervals and around said hollow funnel members to form the side seams of a series of bag sections, said movable members being arranged to engage the interior of said bag sections whereby to effect feeding of the strip.

STANLEY R. HOWARD.